Dec. 31, 1940.   R. W. LUCE   2,226,935
METHOD OF MANUFACTURING LOCK NUTS
Filed Feb. 2, 1939   2 Sheets-Sheet 1

INVENTOR
RICHARD W. LUCE
BY
George T. Gill
ATTORNEY

Dec. 31, 1940.   R. W. LUCE   2,226,935
METHOD OF MANUFACTURING LOCK NUTS
Filed Feb. 2, 1939   2 Sheets-Sheet 2

INVENTOR
RICHARD W. LUCE
BY
George T. Gill
ATTORNEY

Patented Dec. 31, 1940

2,226,935

UNITED STATES PATENT OFFICE 2,226,935

METHOD OF MANUFACTURING LOCK NUTS

Richard Waterman Luce, Westfield, N. J.

Application February 2, 1939, Serial No. 254,215
In Great Britain August 16, 1938

6 Claims. (Cl. 10—86)

The invention herein disclosed relates to a method for making a lock nut of the type disclosed in the copending application Serial No. 167,757, filed October 7, 1937, for Lock nut.

The lock nut disclosed in the aforementioned application is preferably constructed from a single piece of metal and consists of three portions, a tapped body portion having the load carrying threads, a smaller tapped portion displaced from the body portion and a bellows-like resilient portion between the tapped portions. The bellows-like resilient portion consists of two, axially displaced, substantially radial wall sections joined at their outer circumferential edges in a curved circumferential wall section. The threads of the tapped portions are interrupted at the resilient portion and are normally out of phase such that when a bolt enters the nut it causes the resilient bellows portion to expand and thus, the load carrying threads of the body portion are caused to engage the threads of the bolt in frictional engagement. The frictional force between the threads effectively maintains the nut on the bolt against the loosening action of forces of vibration.

The present invention has for an object to provide a method to facilitate the making of such lock nuts from a single piece of metal.

Suggestions have been made to form the bellows-like resilient portion of such lock nuts by a pressing operation in which a long cylindrical section is forced into a bellows-like section. Such an operation requires a metal having extreme characteristics of free workability. Few metals, if any of the type suitable for nuts that are machined from bar stock, possess the characteristics of workability to such an extent. In fact, such metals as possess the characteristic of workability do not possess the characteristic of free machinability or of satisfactory elasticity. For a lock nut of the type described, particularly for the commercial production of such nuts, a compromise must be made in the manufacture such that it is suitable to the metals commonly used for nuts that are machined from bar stock. Such metals have the characteristic of free machinability and the characteristic of workability to a limited extent. The method of manufacturing such lock nuts herein disclosed provides for the characteristics of the metals and by virtue of the method nuts having the desired characteristics of strength in the tapped portions and resiliency in the resilient portions may be manufactured commercially.

The method comprises forming the lock nut from bar stock, preferably bar stock having the requisite polygonal configuration. The piece of bar stock utilized for the nut is of the same length as the finished nut when the resilient section is expanded, as for example before the locking section is compressed. In accordance with the method the bar stock is first drilled longitudinally. The bellows-like resilient portion of the nut is next formed through an internal recessing and external form cutting operation.

This method of manufacturing the nut may be carried out on an automatic screw machine having several stages. The recessing operation may be completely performed in a single stage. However, the length of the internal recessing tool including the thickness of the shank can not, of course, exceed the drilled hole. In consequence, a tool suitable for completing the recessing operation is rather delicate in relation to the amount of metal to be removed and the tool cannot be crowded. Because of this fact, the machine is paced by the recessing operation and materially slowed when a single recessing operation is utilized. For this reason, the recessing is preferably done in several stages as the amount of metal to be removed in relation to the size of a tool is too great to accomplish the recessing at high speed with a single tool and single recessing operation. When done in several stages, the first stage may be performed with a stubby tool which removes a considerable portion of the metal. In the next stage, more of the metal is removed, and in the third stage, which may be the last, another portion of metal is removed and the depth of the recess is lengthened. The radial depth of the cut by each of the several recessing tools is balanced in accordance with the stem diameter of the tool. A suitable arrangement for a three stage operation is to have the first tool effect approximately fifty percent of the depth of the cut, the next tool effect thirty percent and the final tool the remaining twenty percent. The external configuration of the resilient portion is formed by an external form cutting tool.

When so formed, the nut is tapped, the tap being run through the two tapped portions, the body portion and the smaller tapped portion. The nut is then pressed axially such that the bellows-like resilient portion takes a set with the threads of the two portions discontinuous or out of phase an amount sufficient to take care of the thread tolerances of the bolts, and provide a frictional locking force.

This method for manufacturing lock nuts of the type mentioned will be more clearly understood from the following explanation thereof specifically applied to the lock nut and tools illustrated in the accompanying drawings in which.

Figure 1:
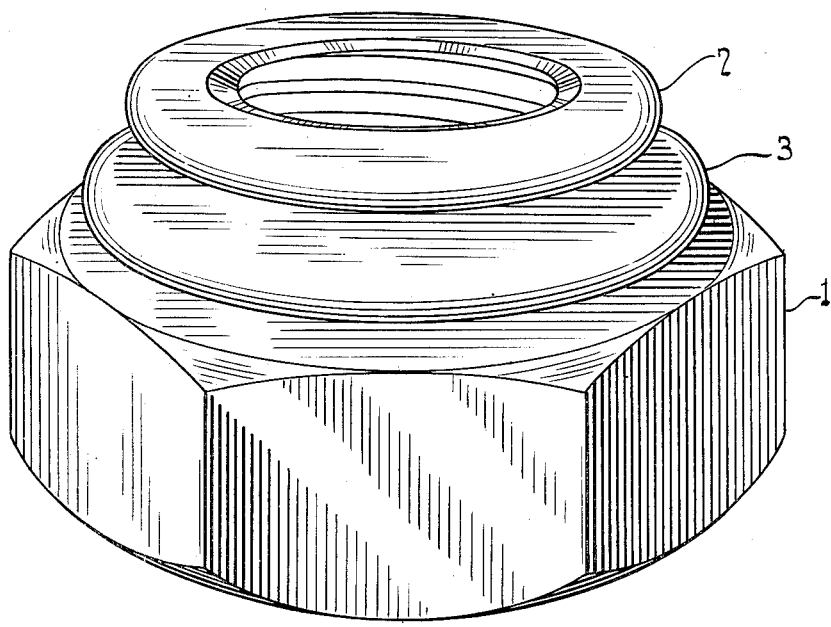
Fig. 1 is an isometric view of the lock nut.
Figure 2:
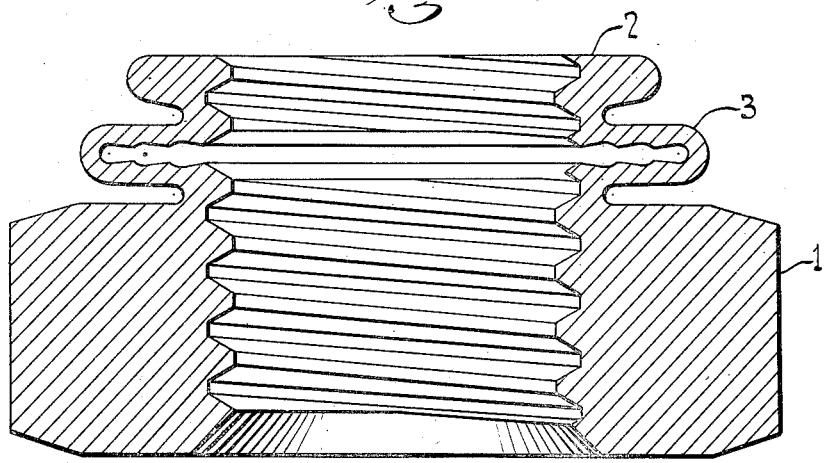
Fig. 2 is a longitudinal section of the finished nut.

The nut illustrated in the drawings includes a body portion 1, a smaller portion 2 axially displaced from the body portion and a bellows-like resilient portion 3 between the portions 1 and 2. In the finished nut the portions 1 and 2 are internally threaded, the threads of the body portion 1 being the load carrying threads of the nut.

Figure 3:
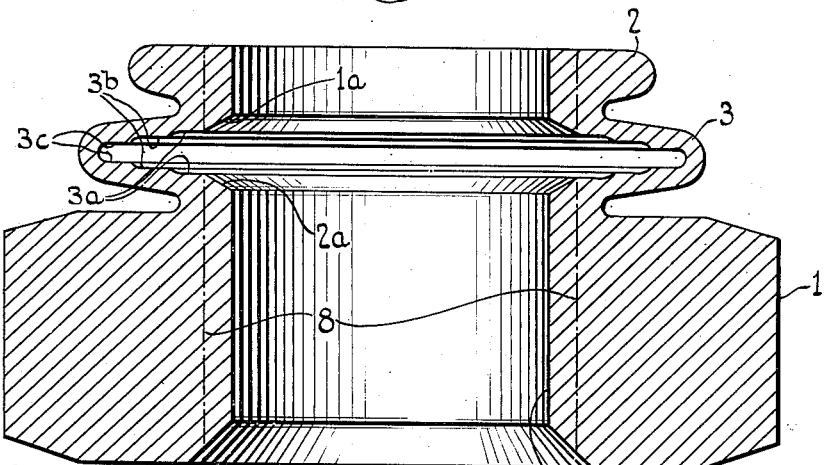
Fig. 3 is a longitudinal section of the nut prior to the tapping operation.
Figure 3A:
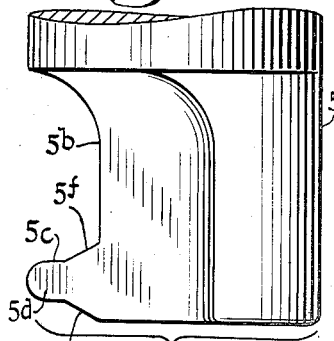
Fig. 3A is a longitudinal elevation of a recessing tool and Fig. 3B is an end view of the same.
Figure 3B:
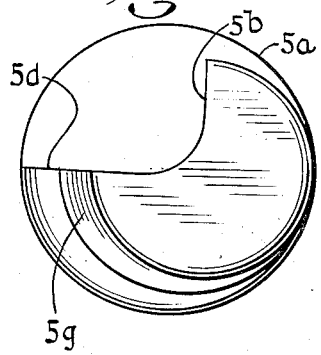

The nut is made from a single piece of bar stock such as hexagonal bar stock. In the first operation, the bar stock is drilled to form the hole 4 through the nut. After the drilling operation the internal recessing of the bellows-like, resilient portion 3 is effected. This is accomplished, particularly in the smaller sized nuts, in three stages. The first stage of the internal recessing operation is performed by a tool 5 as illustrated in Figs. 3A and 3B. The tool 5 includes a shank 5a that is undercut at 5b and a cutting portion 5c at the undercut section of the shank. The cutting face of the tool is at 5d. The length 5e of the tool is slightly less than the diameter of the hole 4. The tool is entered in the hole 4 from the smaller end of the blank and when at the proper axial position it is moved diametrically to effect that portion of the recessing indicated by the line 3a.

The cutting section 5c of the tool 5 is shaped as shown and includes the angular sections 5f and 5g. These form conical surfaces 1a and 2a of the same angle as the thread angle at the juncture of the body portion 1 and the resilient portion and at the juncture of the smaller tapped portion 2 and the resilient portion. This conical surface at the juncture of the resilient portion and at the smaller tapped portion provides a smooth conical surface to engage the end of a bolt entering the nut. Upon entering the smaller tapped portion of the nut, a bolt must expand the resilient portion until the threads thereof come into correspondence with the threads of the bolt. Unless such a bearing surface be provided, the plating on the end of a plated bolt may be injured.

Figure 4A:
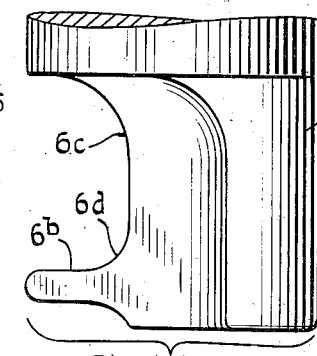
Fig. 4A is a longitudinal elevation of another recessing tool and Fig. 4B is an end view of the same.
Figure 5A:
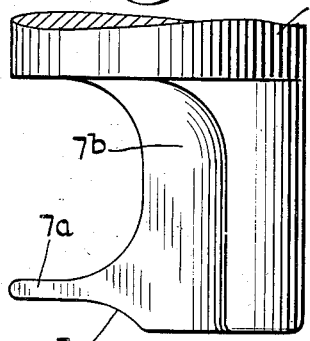
Fig. 5A is a longitudinal elevation of another recessing tool and Fig. 5B is an end view of the same.
Figure 4B:
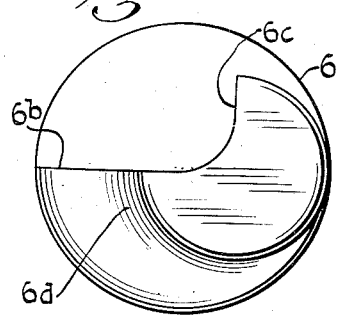
Figure 5B:
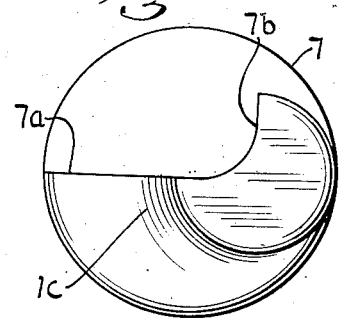

The next stage of the recessing operation is performed by a tool 6 such as that illustrated in Figs. 4A and 4B. This is similar to the tool 5. The overall length 6a of the tool is the same as the tool 5 but the cutting portion 6b is of greater length and the section 6c of the shank is of correspondingly lesser thickness. This tool 6 effects a cut as indicated by the line 3b. The final recessing stage is performed by the tool 7 illustrated in Figs. 5A and 5B. The cutting portion 7a of this tool is, of course, longer than the tool 6 and the undercut section 7b of the shank is necessarily thinner as the overall length of the tool is the same as the preceding tools. This tool removes the portion indicated by the lines 3c. It will be noticed that the tool 5 effects approximately fifty percent of the depth of the cut required to be made in the recessing to form the resilient portion, the tool 6 effects approximately thirty percent and the tool 7 effects approximately twenty percent; and the feed of the tools per revolution of the stock is likewise progressively less.

The cutting faces of the successive tools 5, 6 and 7 are successively narrower an amount just sufficient to provide clearance. Thus, when the tool 6 enters the recess, it does not rub against the walls of the portion cut by the tool 5. Likewise, the tool 7 does not rub against the walls of the portions cut by the tools 5 and 6. The cut effected by the angular section 5f of the tool 5 in addition to providing the inclined surface on the nut provides a space such that a fillet, such as the fillet 6d on the tool 6 and the fillet 7c on the tool 7, may be used on these tools. These fillets add greatly to the strength of these tools so that the cutting speed may be correspondingly increased. The ends of the tools are so shaped that the juncture of successive cuts is curved; there are no sharp edges. Although it has not been illustrated in detail, it will be understood the tools are properly backed off for cutting clearances in accordance with the common practice.

While the recessing of the resilient portion is being accomplished the stock may also be formed externally. Preferably, though not necessarily, the bar stock is roughed down to cylindrical shape of a diameter substantially equal to the external diameter of the resilient portion. An external form cutting tool may then be used to form the external surface of the resilient portion 3 and the smaller tapped portion 1 simultaneously. The external walls of the resilient section are cut at an angle of approximately five degrees to the diameter. The inner surface of the walls follow this inclination in steps as illustrated, the illustration being of course greatly exaggerated. In the finished blank the walls of the resilient portion are of substantially uniform thickness. Preferably the outer and inner curvature of the circumferential portion of the resilient portion 3 are concentric. The broken lines 8 on the blank illustrated in Fig. 3 indicate the root diameter of the threads which are cut in the blank. After the blank is tapped, it is compressed axially so as to take a set with the walls of the resilient section substantially parallel and radial to the axis and with the threads of the two tapped portions out of phase.

The compression of the nut is gauged from the shoulder of the body portion. From a commercial standpoint it is impractical to maintain the overall length of the nut sufficiently accurate to gauge the extent of compression of the bellows-like resilient portion. However, in accordance with this method, the outside of the bellows-like resilient portion and the smaller tapped portion are cut by a single tool simultaneously. The distance, therefore, between the edge of the body portion and the end of the smaller tapped portion is the same within close tolerance for all nuts of the same size. In compressing the bellows-like resilient portion, a cup-shaped collar is fitted over the smaller tapped portion and the resilient portion of the nut is compressed until the edge of the collar engages the adjacent edge of the body portion.

After the nut has been so formed, it may be heat treated or case hardened. This adds greatly to the tensile strength and to the resiliency of the bellows-like resilient portion.

From the foregoing, it will be apparent that by the invention herein disclosed there is provided a method for manufacturing lock nuts of the type specified by which such lock nuts may be made at high speed and economically. Likewise, lock nuts made by this method will be uniform insofar as the torque required to rotate a nut on a bolt is concerned.

It will be obvious that various changes may be made by those skilled in the art in the steps of the method and the details thereof within the principle and scope of the invention as expressed in the appended claims.

I claim:

1. The method of manufacturing a lock nut having two spaced tapped portions and a resilient bellows-like portion therebetween, which method comprises forming the resilient portion of the nut by an internal recessing operation performed in a plurality of stages and an external form cutting operation, tapping the nut, and compressing the nut to cause the resilient portion to take a set with the threads of the two tapped portions out of phase.

2. The method for manufacturing a lock nut having two spaced tapped portions and a resilient bellows-like portion therebetween, which method comprises forming the resilient portion of the nut by an internal recessing and an external form cutting operation, simultaneously with the external form cutting operation of the resilient portion externally form cutting one of the two tapped portions, and compressing the nut axially to cause the resilient portion to take a set with the threads of the two tapped portions out of phase.

3. The method for manufacturing a lock nut having a tapped body portion, a smaller tapped portion and a bellows-like resilient portion therebetween, which method comprises forming the resilient portion of the nut by an internal recessing and an external form cutting operation, forming the exterior of the smaller tapped portion by an external form cutting operation, maintaining the distance from the edge of the body portion adjacent the resilient portion and the edge of the tapped portion accurately, and compressing the nut axially an amount determined by the distance from the end of the smaller tapped portion to the adjacent edge of the body portion.

4. The method for manufacturing a lock nut having a tapped body portion, a smaller tapped portion and a bellows-like resilient portion therebetween which method comprises forming the resilient portion by an internal recessing and external form cutting operation, simultaneously externally form cutting the smaller tapped portion with the external form cutting of the resilient portion to maintain the distance between the end of the smaller tapped portion and the adjacent end of the body portion accurately, and compressing the nut axially an amount determined by the distance from the end of the smaller tapped portion to the adjacent end of the body portion.

5. The method of manufacturing a lock nut having two spaced tapped portions and a resilient portion therebetween, which method comprises internally recessing the resilient portion of the nut, externally form cutting the resilient portion and one of the tapped portions with a single form-cutting tool, and compressing the nut in accordance with a gage arranged to determine the distance from the tapped portion cut with the form-cutting tool to the other tapped portion.

6. The method of manufacturing a lock nut having two spaced tapped portions and a resilient bellows-like portion therebetween, which method includes the step of forming the resilient portion of the nut by an internal recessing operation performed in a plurality of stages and an external form-cutting operation.

RICHARD W. LUCE.